US012755460B1

(12) United States Patent
Chen

(10) Patent No.: US 12,755,460 B1
(45) Date of Patent: Oct. 6, 2026

(54) PICTURE CONTENT ENHANCEMENT METHOD AND SYSTEM, AND ELECTRONIC DEVICE

(71) Applicant: UC GLOBAL TRADE INC., Chino, CA (US)

(72) Inventor: Junjun Chen, Chino, CA (US)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 19/460,245

(22) Filed: Jan. 26, 2026

(51) Int. Cl.

| | |
|---|---|
| ***G06T 11/60*** | (2026.01) |
| ***G06T 7/246*** | (2017.01) |
| ***G06T 7/73*** | (2017.01) |
| ***H04N 21/2187*** | (2011.01) |
| ***H04N 21/431*** | (2011.01) |
| ***H04N 21/4725*** | (2011.01) |
| ***H04N 21/478*** | (2011.01) |

(52) U.S. Cl.
CPC .............. *G06T 11/60* (2013.01); *G06T 7/246* (2017.01); *G06T 7/73* (2017.01); *H04N 21/2187* (2013.01); *H04N 21/4316* (2013.01); *H04N 21/4725* (2013.01); *H04N 21/47815* (2013.01); *G06T 2207/10016* (2013.01)

(58) Field of Classification Search
CPC .............. G06T 7/60; G06T 7/246; G06T 7/73
See application file for complete search history.

(56) References Cited

U.S. PATENT DOCUMENTS 9,762,515 B1 9/2017 Olivares et al.
2016/0006803 A1 1/2016 Citrix
2018/0185753 A1* 7/2018 Nakagawa .............. G06F 3/011
2019/0044826 A1 2/2019 L. L. C
2019/0147602 A1* 5/2019 Tao ...................... G06V 10/809
382/103
2020/0043479 A1* 2/2020 Mont-Reynaud ....... G06F 40/58
2020/0175981 A1 6/2020 Li
(Continued)

FOREIGN PATENT DOCUMENTS

CN 115065873 A 9/2022

OTHER PUBLICATIONS

Gienger Dr Michael; Robot With Hand-object Movement Correlations For Online Temporal Segmentation Of Movement Tasks; 2011 (Year:2011).

(Continued)

*Primary Examiner* — Yi Yang
(74) *Attorney, Agent, or Firm* — FIDELI LAW PLLC

(57) ABSTRACT

Embodiments of this application provide a picture content enhancement method and system, and an electronic device, and relate to the field of computer vision and video content enhancement technologies. The method includes: recognizing and tracking at least one first target object based on a picture video stream, to obtain attribute information and real-time position information of the first target object; obtaining status data associated with the first target object; and for any first target object, generating a corresponding information buoy by using the real-time position information as a spatial anchor, and overlaying and rendering the information buoy onto a corresponding frame of the picture video stream, where visual content of the information buoy dynamically reflects the status data. The method is used to improve interaction.

19 Claims, 3 Drawing Sheets

(56) References Cited

U.S. PATENT DOCUMENTS

| | | | | |
|---|---|---|---|---|
| 2020/0309944 | A1* | 10/2020 | Thoresen | G06T 19/006 |
| 2022/0156999 | A1 | 5/2022 | Inc. | |
| 2022/0270302 | A1* | 8/2022 | Iwaki | G06T 11/00 |
| 2023/0394771 | A1* | 12/2023 | Bilinski | G06T 7/70 |
| 2024/0142978 | A1* | 5/2024 | Audronis | G05D 1/6987 |
| 2024/0390219 | A1 | 11/2024 | Liu et al. | |
| 2025/0367063 | A1 | 12/2025 | Liu et al. | |
| 2025/0387292 | A1 | 12/2025 | Ltd | |

OTHER PUBLICATIONS

Etecnno News: Feel the Beat: "Groove Thing" Kickstarter Success Ushers in Era of Body-Responsive Music—Jul. 1, 2025, pp. 1-4 https://news.etecno.tv.in/2025/07/feel-beat-groove-thing-kickstarter.html (Year:2025).

* cited by examiner

PICTURE CONTENT ENHANCEMENT METHOD AND SYSTEM, AND ELECTRONIC DEVICE

TECHNICAL FIELD

This application relates to the field of computer vision and video content enhancement technologies, and in particular, to a picture content enhancement method and system, and an electronic device.

BACKGROUND

With deep integration of livestream e-commerce and interactive entertainment, a live streamer demonstrates and operates a target commodity live to show functional features of the target commodity, which has become an important way to improve a live streaming effect and audience participation. In such a scenario, the audience has a strong visual perception requirement for real-time and variable attribute information of the target commodity (for example, a vibration mode of an intelligent toy, elastic deformation of a garment, and running parameters of an electronic device) presented in a demonstration process.

At present, in the related technology, picture feedback for a real-time attribute of the target commodity is mainly implemented in the following manner: The live streamer informs the audience of a current status of the commodity through oral introduction in a live streaming process. Alternatively, related information is published in a text form by using a text bullet screen function of a live streaming platform. In some solutions, a fixed information bar or annotation area is further set on a live streaming picture, to statically present a basic introduction or preset parameters of the commodity.

However, in the foregoing manner, the audience cannot quickly and accurately obtain real-time status information of the commodity from the picture, thereby reducing interaction.

SUMMARY

Embodiments of this application provide a picture content enhancement method and system, and an electronic device, to improve live streaming interaction by accurately displaying status data of commodities on a live streaming picture in real time.

According to a first aspect, an embodiment of this application provides a picture content enhancement method. The method includes:

recognizing and tracking at least one first target object based on a picture video stream, to obtain attribute information and real-time position information of the first target object;

obtaining status data associated with the first target object; and for any first target object, generating a corresponding information buoy by using the real-time position information as a spatial anchor, and overlaying and rendering the information buoy onto a corresponding frame of the picture video stream, where visual content of the information buoy dynamically reflects the status data.

In some embodiments, the overlaying and rendering the information buoy onto a corresponding frame of the picture video stream includes:

recognizing and tracking at least one preset key region of a second target object; and adjusting a rendering position of the information buoy according to a preset avoidance rule when detecting that the information buoy overlaps any preset key region.

In some embodiments, the recognizing and tracking at least one preset key region of a second target object includes:

dynamically determining a real-time position of the preset key region based on the picture video stream and/or pre-obtained action data associated with the second target object.

In some embodiments, the dynamically determining a real-time position of the preset key region based on the picture video stream and/or pre-obtained action data associated with the second target object includes:

performing frame-by-frame processing on the picture video stream by using a posture recognition algorithm based on a pre-trained multi-part detection model, and directly outputting coordinates of each preset key region in an image; or obtaining a preset standard action sequence synchronized with the picture video stream, and mapping and reading corresponding standard position coordinates from the preset standard action sequence as the real-time position based on a time point of a current frame of the picture video stream, where the preset standard action sequence is used to indicate standard position coordinates of the at least one preset key region that correspond to a time point of each frame of the picture video stream.

In some embodiments, the dynamically determining a real-time position of the preset key region based on the picture video stream and/or pre-obtained action data associated with the second target object includes:

obtaining first real-time position information based on the picture video stream;

obtaining second real-time position information based on the pre-obtained action data associated with the second target object; and performing fusion processing on the first real-time position information and the second real-time position information according to a preset fusion rule, to output a final real-time position.

In some embodiments, the preset key region is a body region that is of the second target object and that is associated with display of the first target object.

In some embodiments, the detecting that the information buoy overlaps any preset key region includes:

calculating an intersection over union between a rendering region of the information buoy and a predetermined region constructed based on a real-time position of the preset key region; and if the intersection over union is greater than zero, determining that there is an overlap.

In some embodiments, the adjusting a rendering position of the information buoy according to a preset avoidance rule includes:

predefining a plurality of candidate positions around the spatial anchor;

selecting a target candidate position that overlaps none of all preset key regions from the candidate positions; and determining a target rendering position of the information buoy from the target candidate position according to a preset order.

In some embodiments, when at least two first target objects are recognized, the adjusting a rendering position of the information buoy according to a preset avoidance rule includes:

establishing a global layout constraint, where the global layout constraint includes that an overlap rate between information buoys is less than a first preset value, and an overlap rate between each information buoy and each preset key region is less than a second preset value; and performing synchronous calculation and allocation on a rendering position of each information buoy based on the global layout constraint.

In some embodiments, the generating a corresponding information buoy by using the real-time position information as a spatial anchor includes:

generating a main body graphic and a pointing graphic of the information buoy, where the main body graphic includes visual content of the attribute information and the status data of the first target object; and configuring the pointing graphic, so that one end of the pointing graphic is connected to the main body graphic and another end points to the spatial anchor, to obtain the information buoy and establish a visual association between the main body graphic and the first target object.

In some embodiments, the method further includes:

establishing a mapping relationship between at least one numerical value of the status data and at least one corresponding visual dynamic parameter; and driving, based on the mapping relationship, the information buoy to perform dynamic rendering, where the visual dynamic parameter includes at least one of dynamic effects of the information buoy, and the dynamic effects include an occupied area, a color value, a flicker frequency, or a position jitter amplitude.

In some embodiments, the obtaining status data associated with the first target object includes:

establishing a data connection with the first target object;

receiving, through the data connection, a sensor data stream that is output by a sensing unit of the first target object; and parsing the sensor data stream to obtain the status data.

In some embodiments, the obtaining status data associated with the first target object includes:

collecting at least one input signal associated with manipulation behavior of a second target object, where the input signal includes an operation instruction signal from a control panel or an image signal from the picture video stream; and generating the status data according to a corresponding parsing rule based on a type of the collected input signal.

In some embodiments, the parsing rule includes:

when the operation instruction signal is collected, parsing the operation instruction signal into the status data based on a first mapping relationship;

when the image signal is collected, extracting an action feature from the image signal by using an image recognition technology, and converting the action feature into the status data based on a second mapping relationship; or when both the operation instruction signal and the image signal are collected, generating a reference status parameter based on the operation instruction signal, and correcting the reference status parameter based on an action feature extracted from the image signal, to obtain the status data.

In some embodiments, the obtaining status data associated with the first target object includes:

obtaining a preset status script synchronized with a picture content timeline, where the status script includes a real-time display status defined according to a time sequence; and querying a corresponding target display status from the status script based on a current picture timestamp, and generating the status data based on the target display status.

In some embodiments, the obtaining status data associated with the first target object includes:

obtaining at least one associated signal, where the associated signal includes an image signal from the picture video stream, a voice signal of a second target object, and a visual change signal of the first target object; and performing fusion analysis on the at least one associated signal based on a preset inference model, to determine the status data.

In some embodiments, the recognizing and tracking at least one first target object based on a picture video stream includes:

performing frame-by-frame target detection on the picture video stream, to recognize a candidate first target object region;

extracting an appearance feature based on the candidate first target object region by using a re-identification network; and maintaining an independent tracking trajectory and assigning a unique identity for each continuously tracked first target object based on the appearance feature and motion trajectory information.

In some embodiments, the overlaying and rendering the information buoy onto a corresponding frame of the picture video stream includes:

determining an initial rendering position of the information buoy in a picture coordinate system based on the spatial anchor defined by the real-time position information;

verifying the initial rendering position, and adjusting the initial rendering position according to a preset boundary avoidance rule when a partial or entire region of the information buoy exceeds a picture display boundary, so that an adjusted information buoy is completely located within the picture display boundary; and performing composite rendering on the information buoy located at an adjusted rendering position and a current frame image of the picture video stream in a transparency blending manner.

According to a second aspect, an embodiment of this application provides a picture content enhancement system. The system includes:

a target object recognition module, configured to recognize and track at least one first target object based on a picture video stream, to obtain attribute information and real-time position information of the first target object;

a status data capture and synchronization module, configured to obtain status data associated with the first target object; and a buoy generation and overlay module, configured to: for any first target object, generate a corresponding information buoy by using the real-time position information as a spatial anchor, and overlay and render the information buoy onto a corresponding frame of the picture video stream, where visual content of the information buoy dynamically reflects the status data.

According to a third aspect, an embodiment of this application provides an electronic device, including at least one processor and a memory.

The memory stores computer-executable instructions.

The processor executes the computer-executable instructions stored in the memory, so that the processor performs the first aspect and/or various embodiments of the first aspect.

According to a fourth aspect, an embodiment of this application provides a computer-readable storage medium. The computer-readable storage medium stores computer-executable instructions, and the computer-executable instructions are executed by a processor to implement the first aspect and/or various embodiments of the first aspect.

According to a fifth aspect, an embodiment of this application provides a computer program product, including a computer program. The computer program is executed by a processor to implement the first aspect and/or various embodiments of the first aspect.

Embodiments of this application provide a picture content enhancement method and system, and an electronic device. In the picture content enhancement method, a real-time position of a first target object is recognized and tracked in a picture video stream, and an information buoy that can visually reflect status data of the first target object is dynamically generated and rendered by using the position as a spatial anchor, to convert an invisible physical status parameter into a dynamic visual symbol that is strongly associated with a visual image of the first target object and that has a synchronized spatial position, so that the audience can intuitively perceive a real-time status of the first target object in real time without any additional cognition transformation, thereby helping improve intuition and immersion of live streaming interaction, and further enhance live streaming interaction.

BRIEF DESCRIPTION OF DRAWINGS

The accompanying drawings herein are incorporated into this specification and constitute a part of this specification, to show embodiments in accordance with this application, and are used together with this specification to explain the principle of this application.

Figure 1:
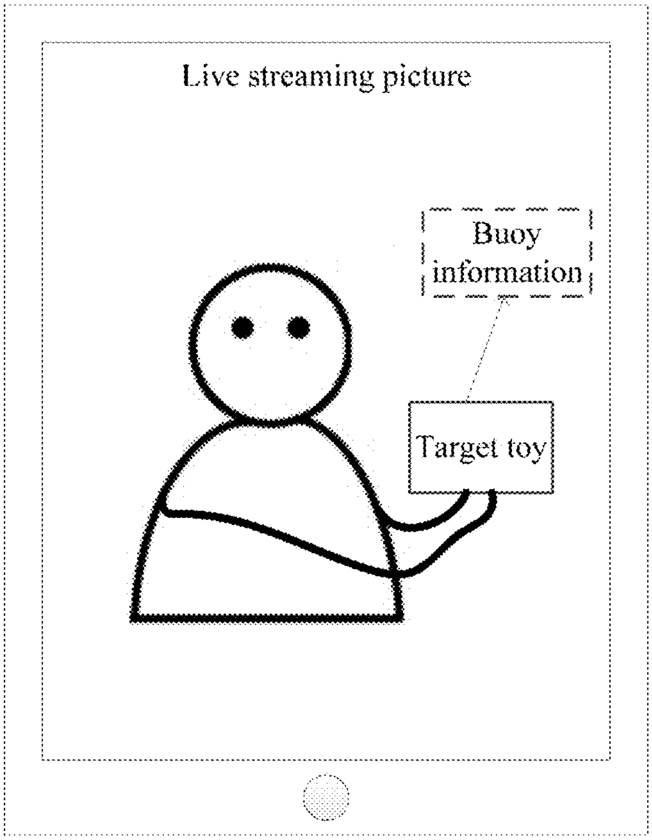
FIG. 1 is a schematic diagram of a scenario of a picture content enhancement method according to this application.

The foregoing accompanying drawings show specific embodiments of this application, and more detailed descriptions are provided below. The accompanying drawings and text descriptions are not intended to limit the scope of the idea of this application in any manner, but are intended to describe the concept of this application for a person skilled in the art with reference to particular embodiments.

DESCRIPTION OF EMBODIMENTS

Reference will now be made in detail to exemplary embodiments, examples of which are illustrated in the accompanying drawings. When the following description relates to the accompanying drawings, unless otherwise specified, same numbers in different accompanying drawings represent a same element or similar elements. Implementations described in the following example embodiments do not represent all implementations consistent with this application. On the contrary, the implementations are merely examples of apparatuses and methods that are described in the appended claims in detail and that are consistent with some aspects of this application.

With rapid development of Internet live streaming technologies, a live streaming scenario extends from conventional entertainment performance and game commentary to more subdivided interaction fields. A live streamer performs real-time feedback interaction with the audience by manipulating a target commodity, or presents functional features of a commodity in detail during live streaming for e-commercial marketing or product demonstration, which gradually becomes an important form of improving user participation and live streaming attraction.

In such a scenario, a real-time dynamic display status of the target commodity is key information for the audience to understand commodity functions and participate in interaction. Therefore, the audience has an increasingly strong visual and instant perception requirement for such information. Whether real-time dynamic attributes of the commodity can be quickly and accurately obtained directly affects users' understanding efficiency and interaction willingness for live streaming content.

Currently, in the related technology, a feedback mechanism for a dynamic status of a commodity is obviously limited, and mainly relies on three implementations. A first implementation relies on oral introduction of a live streamer. In other words, the live streamer orally informs the audience of status change information in real time while manipulating a commodity. A second implementation is to transfer information by using a text bullet screen function of a live streaming platform, and a live streamer or a system sends related parameters to a bullet screen area in a text form. A third implementation is that a fixed static annotation area, such as a text box or an icon in a picture corner, is set on a live streaming picture in some solutions, to present preset basic information of a commodity, such as "maximum vibration strength" and "default frequency".

However, the first implementation is limited to a presentation capability and a reaction speed of the live streamer, and a problem of a lag or inaccuracy of introduction is prone to occur. In the second implementation, the audience is distracted to read a text while paying attention to a live streaming picture, resulting in low information obtaining efficiency. In the third implementation, the annotation is not associated with a real-time position of a toy on a picture, cannot be dynamically updated to reflect a current commodity status, and can only exist as a static introduction.

It can be learned from the foregoing content that, in all the foregoing implementations, it is difficult for the audience to quickly and accurately obtain a real-time status of a commodity from a picture. This not only increases a threshold for information understanding, but also decreases a depth of interaction between users and picture content enhancement, and finally leads to interaction reduction.

Therefore, this application provides a picture content enhancement method and system, and an electronic device. In the picture content enhancement method, a real-time position of a first target object is recognized and tracked in a target picture, status data associated with the first target object is obtained, an information buoy is generated by using the real-time position as a spatial anchor, and the status data is mapped to the information buoy and overlaid onto the target picture. This resolves a problem that a real-time display status of a commodity cannot be intuitively associated with a visual image of the commodity on a picture in real time, and therefore a user needs to additionally associate information to perceive the commodity status, thereby helping enhance interaction.

It may be understood that the picture content enhancement method in this application is applicable to any toy function visual display scenario. For example, FIG. 1 is a schematic diagram of an application scenario of a picture content enhancement method according to an embodiment of this application. As shown in FIG. 1, the method in this application may be applied to an adult toy sales live streaming scenario, and is used to convert a real-time vibration parameter of a toy into dynamic visual information, for display in precise binding with the toy on a live streaming picture.

Currently, in the toy sales live streaming scenario, a live streamer needs to clearly communicate core selling points such as vibration performance (for example, strength and frequency) of the toy to the audience. However, a conventional oral introduction or text annotation manner cannot implement intuitive perception of the audience, which directly affects a purchase decision and interaction enthusiasm. Therefore, a solution for implementing synchronous visualization of a toy status and a picture is urgently needed.

When the method in this application is applied to the toy sales live streaming scenario, a position of a toy displayed on a picture is recognized in real time by using a live streaming device, real-time vibration data of the toy is synchronously obtained, a dynamic information buoy is generated beside the toy, and parameters such as vibration strength and frequency are presented in a visual form and synchronously follow toy movement, to ensure that the buoy always precisely corresponds to the toy.

Through application of the method in this application, the audience can directly intuitively obtain a toy vibration status from a live streaming picture in real time, without relying on introduction of the live streamer or distracting attention to read a text, so that the audience can quickly understand functional advantages of the toy, and then more actively interact with the live streamer in a manner such as posting live comments or tipping, thereby effectively improving interaction popularity and conversion efficiency in the live streaming sales scenario.

It should be understood that the picture content enhancement method in this application is not limited to the foregoing toy sales live streaming application, but is also applicable to any toy function visual display scenario such as adult toy teaching demonstration, adult toy function test and evaluation, and parent-children interaction toy display. This is not limited in the embodiments.

In addition, the picture content enhancement method in this application is not limited to the foregoing toy-related scenario, and a core objective is to provide a general solution for any scenario in which a dynamic attribute of a commodity needs to be fed back in real time. For example, the method in this application is also applicable to clothing display live streaming. In this case, the commodity is specifically a garment, and status data of the commodity may be an elastic deformation degree of a fabric, a gloss change under particular illumination, and the like. The method in this application is further applicable to household appliance test and evaluation live streaming. In this case, the first target object is specifically a hair dryer, and status data of the first target object may be a real-time wind speed gear, a temperature of an air outlet, and the like. This is not limited in the embodiments. In the method in this application, these different types of dynamic parameters can be visualized and bound to the commodity to enrich information dimensions and expressiveness of commodity display, to improve user experience.

In addition, it should be understood that an execution body of the method is not particularly limited in this application. The method may be implemented by any electronic device that has a data processing and picture processing capability, such as a live streaming device, a control module built in a toy, a background server, and a mobile terminal. This is not limited in the embodiments.

The following describes, by using specific embodiments, in detail the technical solutions of this application and how the technical solutions of this application resolve the foregoing technical problems. The following several specific embodiments may be combined with each other. For same or similar concepts or processes, details may not be described in some embodiments. The following describes embodiments of this application with reference to the accompanying drawings.

Figure 2:
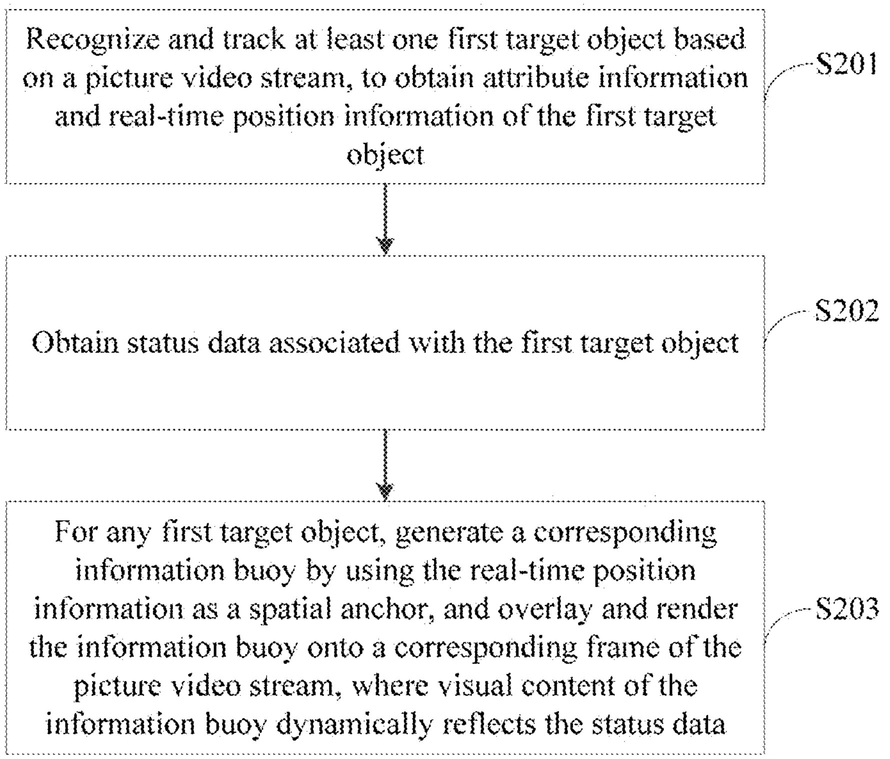
FIG. 2 is a schematic flowchart 1 of a picture content enhancement method according to this application.

This application provides an embodiment of a picture content enhancement method. FIG. 2 is a schematic flowchart 1 of picture content enhancement according to this application. The following uses application to a toy sales live streaming scenario as an example to describe the method in this embodiment in detail with reference to FIG. 2. As shown in FIG. 2, the method includes the following steps.

S201. Recognize and track at least one first target object based on a picture video stream, to obtain attribute information and real-time position information of the first target object.

In this embodiment, the first target object specifically refers to various commodities used for visual display, including but not limited to an adult toy, a garment, a 3C digital product, a household item, a cosmetic product, food, and the like, and is a core object that needs to be presented and introduced to the audience in a live streaming or demonstration scenario.

It should be understood that the picture video stream refers to a consecutive-frame image sequence that is captured in real time by using an image capture device and that includes the first target object, and may be from various visual display scenarios such as live video shooting, recording, and real-time demonstration. At least one first target object to be displayed and introduced to the audience exists on the picture. The attribute information of the first target object includes information that can distinguish between different commodities or represent basic commodity features, such as a commodity type, a model, an appearance feature representation, and a preset functional parameter. The real-time position information refers to dynamic coordinate information of the first target object in consecutive frames of the picture, includes but is not limited to two-dimensional pixel coordinates of the first target object on the picture, a position offset relative to a picture boundary, and center point coordinates of a core region of the first target object, and is used to accurately reflect a moving trajectory and a current position of the first target object on the picture.

An adult toy is used as an example. The attribute information specifically includes information that can distinguish between different toys or represent basic toy features, such as a toy type, a model, an appearance feature identifier, and a preset functional parameter range. The real-time position information refers to dynamic coordinate information of a target toy in consecutive frames of the picture, includes but is not limited to two-dimensional pixel coordinates of the toy on the picture, a position offset relative to a picture boundary, and center point coordinates of a core region of the toy, and can accurately reflect a moving trajectory and a current position of the toy on the picture.

In this embodiment, the image capture device is specifically a live streaming device. The live streaming device performs frame-by-frame target detection on the picture video stream to recognize a candidate first target object region; extracts an appearance feature based on the candidate first target object region by using a re-identification network; and maintains an independent tracking trajectory and assigns a unique identity for each continuously tracked first target object based on the appearance feature and motion trajectory information.

Specifically, in this embodiment, a depth-learning-based target detection algorithm (such as YOLO or Faster R-CNN) is used to scan each frame of image in the picture video stream captured by the live streaming device, a candidate region that may include the first target object is recognized from the image by using a preset category training model (various first target object sample features have been annotated in advance), and bounding box coordinates of the region are output, to preliminarily select a potential first target object.

Further, for the detected candidate first target object region, the re-identification network (for example, a ResNet series network improvement model) is used to perform depth extraction on an image feature in the region, to obtain a feature vector (including detailed information such as color distribution, a texture feature, and a shape outline) that can uniquely represent an appearance of the first target object, to distinguish between different first target objects.

Finally, with reference to motion trajectory information of a candidate first target object in a neighboring frame (a displacement trend of a commodity is predicted by using an optical flow method or Kalman filtering), an appearance feature extracted from a current frame is matched with a feature vector of a tracked commodity in a historical frame. When a matching degree exceeds a preset threshold, it is determined that the candidate first target object is the same first target object, and a tracking trajectory is continued for the first target object. For a new candidate first target object (feature matching fails), a new unique identity (such as an ID number) is assigned, to implement independent and continuous tracking of a plurality of first target objects.

When obtaining the foregoing appearance feature, the live streaming device determines attribute information of each first target object (for example, a model and a preset vibration parameter range of an adult toy) by matching the appearance feature with a preset database, and finally obtains the attribute information and the real-time position information of the first target object with reference to coordinate data corresponding to a real-time motion trajectory, to provide a basis for subsequent information buoy generation.

In practical application, recognition and tracking of the at least one first target object may be alternatively implemented in another implementation, for example, implemented by using a conventional computer vision algorithm (for example, target matching based on a color histogram in combination with a MeanShift tracking algorithm), without relying on a deep learning model. This is applicable to a scenario in which the appearance feature of the first target object is simple and a background is single. Alternatively, a multi-device collaborative recognition solution is used, and a live streaming device is responsible for capturing a picture. A background server deploys a high-performance detection and tracking model, transmits a video stream over a network to the cloud for processing, and then returns a recognition and tracking result to the live streaming device. This is applicable to a scenario in which a computing power requirement for a front-end device is relatively low. This is not limited in the embodiments.

In addition, in practical application, after an appearance feature vector of the candidate first target object region is extracted, the attribute information and the real-time position information of the first target object may be obtained in the following manner: (1) An identifier such as a two-dimensional code or a barcode on a surface of the first target object is parsed by using an image recognition technology, the corresponding attribute information such as a model and a parameter range is obtained through direct association with a preset database, and center coordinates of a region in which the identifier is located are used as the real-time position information. (2) A first target object attribute manual configuration instruction (for example, selecting a model and entering a preset parameter) that is input by a second target object through a control panel is received, and complete attribute information and real-time position information are formed through integration with reference to center coordinates of a toy bounding box obtained through picture tracking. (3) A unique device identifier (such as a MAC address) of the first target object is read by using an internet of things (IoT) protocol, attribute data is obtained through association with a cloud information base, and real-time tracking coordinates of the first target object on the picture are synchronously used as position information. (4) A preset type template library is matched based on appearance features such as a size and a color of the first target object, a category to which the first target object belongs and a corresponding basic attribute are determined, and the real-time position information is obtained with reference to trajectory tracking data. This is not limited in the embodiments.

In this embodiment, in an implementation of target detection based on deep learning+feature extraction via the re-identification network+trajectory and feature fusion tracking, the first target object on the picture can be accurately recognized and the attribute information of the first target object can be extracted in a complex live streaming scenario (for example, in a case in which a background is disordered, and the first target object has a high moving speed and is partially occluded). In addition, an independent trajectory tracking mechanism based on a unique identity can effectively avoid identity confusion in a scenario with a plurality of first target objects, ensure continuity and accuracy of real-time position information, and lay a foundation for subsequent precise binding of an information buoy, thereby improving reliability and stability of picture content enhancement.

S202. Obtain status data associated with the first target object.

In this embodiment, the status data is used to indicate real-time dynamic data that can reflect a core feature, a usage status, a performance indicator, or demonstration details of the first target object in a live demonstration process, and the parameter is adapted in a targeted manner based on different commodity types, and is a core basis for visual content of an information buoy.

For an adult toy, the status data includes performance parameters such as a vibration status parameter, a battery level, a sense of pressure, a voltage, an air pressure, gyroscope balance data, a swing amplitude, a color value of a lamp, a current mode, and strength. The vibration status parameter includes whether to vibrate (Boolean value: yes/no), vibration strength (for example, a quantized value in a range of level 0 to level 100, where level 0 corresponds to "no vibration"), vibration frequency (for example, a quantity of vibration times per second), a vibration mode (for example, continuous vibration, intermittent vibration, and pulse vibration), and vibration duration.

For a garment, the status data includes a fabric characteristic parameter (for example, a material type, air permeability, an elastic coefficient, and drapability), a pattern size parameter (for example, measured values such as a garment length, a sleeve length, a waistline, and a shoulder breadth that are displayed in real time), a design detail parameter (for example, display annotation of a printing technology, a button material, and an embroidery texture), a wear adaptation parameter (for example, appropriate height and weight ranges, a wear scenario suggestion, and a wash and care prompt), and a dynamic display parameter (for example, an elasticity recovery rate under a stretching action, and a 360° pattern fit degree presented by a live streamer by turning around).

For a 3C digital product (for example, a wireless Bluetooth headset), the status data includes a connection status parameter (for example, a Bluetooth pairing status, a quantity of connected devices, and signal strength), a performance parameter (for example, a play volume level, a sound effect mode, and a noise reduction gear), a battery level parameter (for example, a remaining battery level of the headset, a remaining battery level of a charging case, and a charging power), a usage status parameter (for example, battery life duration and cumulative usage duration), and a function demonstration parameter (for example, a touch operation response result and a voice assistant wake-up status).

In this embodiment, in an implementation, the live streaming device obtains the status data in the following manner: establishing a data connection with the first target object; receiving, through the data connection, a sensor data stream that is output by a sensing unit of the first target object; and parsing the sensor data stream to obtain the status data.

Specifically, that the first target object is an adult toy is used as an example. A three-axis acceleration sensor and a gyroscope (a core component of an inertial measurement unit) are built in the target toy. A sensor collects acceleration change data (unit: $m/s^2$) and angular velocity change data (unit: rad/s) in a vibration process in real time at a preset sampling frequency. The live streaming device establishes a wireless connection to the toy by using the Bluetooth BLE protocol, and receives a preset quantity of groups of sensor raw data per second.

Further, the live streaming device first performs filtering processing (for example, removes ambient noise by using a Kalman filtering algorithm) on the received data stream, and sets an acceleration threshold (for example, 0.5 $m/s^2$). When a filtered acceleration peak value exceeds the threshold, "whether to vibrate" is determined to be "yes"; otherwise, it is determined to be "no". Then, the acceleration peak value is mapped to vibration strength in a range of level 0 to level 100 (a peak value 0.5 $m/s^2$ corresponds to the strength 0, and a peak value 50 $m/s^2$ corresponds to the strength 100). The vibration frequency (for example, the frequency is 5 Hz if an interval is 0.2 seconds) is calculated by using a time interval between two consecutive peak values. The vibration mode is determined by using a waveform feature in N consecutive seconds to match a preset mode library (for example, "uniform peak value distribution" corresponds to a continuous mode, and "peak value interval increasing gradually" corresponds to an attenuation mode). Duration in which "whether to vibrate" is "yes" is used to count vibration duration. Finally, a complete real-time vibration status parameter is formed through integration.

It should be understood that the live streaming device may alternatively establish a communication connection to the toy by using a wireless communication protocol such as Wi-Fi or ZigBee or in a USB wired communication manner. In addition, parameters such as a sampling frequency of the sensor, an acceleration threshold, and a vibration strength mapping rule may be flexibly configured based on a toy type or an application scenario. This is not limited in the embodiments.

In the foregoing implementation, raw data of the built-in sensor of the first target object is directly collected and parsed, so that not only a basic status of vibration can be accurately determined, but also a multi-dimensional vibration parameter can be synchronously obtained. Data precision is high, and a transmission delay is low. This ensures that a real-time display status is completely consistent with an actual working status of the first target object, and provides core support for accuracy of subsequent visual presentation.

In another implementation, the live streaming device obtains the status data in the following manner: collecting at least one input signal associated with manipulation behavior of a second target object, where the input signal includes an operation instruction signal from a control panel or an image signal from the picture video stream; and generating the status data according to a corresponding parsing rule based on a type of the collected input signal.

The second target object is an operator that controls the first target object or performs commodity demonstration in a picture scene, and includes but is not limited to a live streamer for live streaming marketing, a product demonstrator, a guide in an interaction scenario, a virtual character, or the like. The parsing rule includes: when the operation instruction signal is collected, parsing the operation instruction signal into the status data based on a first mapping relationship; when the image signal is collected, extracting an action feature from the image signal by using an image recognition technology, and converting the action feature into the status data based on a second mapping relationship; or when both the operation instruction signal and the image signal are collected, generating a reference status parameter based on the operation instruction signal, and correcting the reference status parameter based on an action feature extracted from the image signal, to obtain the status data.

Specifically, the first mapping relationship is an operation instruction-status data correspondence rule that is solidified in advance in the system. For example, an adult toy is used as an example. The correspondence rule includes: A "start vibration" instruction corresponds to "whether to vibrate=yes"; a "stop vibration" instruction corresponds to "whether to vibrate=no"; a percentage (0%-100%) of a strength adjustment slider is directly mapped to the vibration strength in a range of level 0 to level 100; a mode selection button (such as "continuous", "intermittent", and "pulse") directly corresponds to a vibration mode of the same name; and a gear (gear 1 to gear 10) of a frequency adjustment knob is mapped to the vibration frequency in a range of 1 Hz to 10 Hz.

The second mapping relationship is an action feature-status data correspondence rule established in advance through sample training. For example, an adult toy is used as an example. The correspondence includes: "Finger bending angle≥30° and duration≥0.5 seconds" corresponds to "whether to vibrate=yes"; "finger bending angle<30° or duration<0.5 seconds" corresponds to "whether to vibrate=no"; a finger bending angle (30° to) 90° is linearly mapped to the vibration strength in a range of level 0 to level 100; a quantity of hand shaking times per second (1 to 10 times) is mapped to the vibration frequency in a range of 1 Hz to 10 Hz; and a hand press rhythm (even press corresponds to a continuous mode, intermittent press corresponds to an intermittent mode, and quick press corresponds to a pulse mode) is mapped to the vibration mode.

Based on this, the live streaming device collects the operation instruction signal by using a built-in or external control panel (such as a physical button, a touchscreen, or a virtual interface). In addition, the picture video stream is captured by using a camera, and an image frame that includes the second target object and that is used to display a part of the first target object is captured in real time as the image signal.

When only the operation instruction signal is collected, the first mapping relationship is directly queried, and the instruction is converted into corresponding status data based on a type of the first target object. For an adult toy, the instruction is converted into corresponding "whether to vibrate", "vibration strength", "vibration frequency", and "vibration mode", and duration of "whether to vibrate=yes" is counted to form real-time status data. When only the image signal is collected, hand joint point coordinates are extracted by using an OpenCV algorithm, action features such as a finger bending angle, a quantity of hand shaking times, and a press rhythm are calculated, and then the second mapping relationship is queried, to convert the features into complete real-time status data.

When the two types of signals are collected at the same time, the reference status parameter (which is a reference vibration parameter for an adult toy, including whether to vibrate, reference strength, reference frequency, and reference mode; or a reference display parameter for a clothing commodity, including reference material, reference size, and reference elastic coefficient) is generated based on the operation instruction signal by using the first mapping relationship. Then, the action feature in the image signal is extracted, and a correction coefficient is determined based on the second mapping relationship (for example, if the finger bending angle exceeds a reference angle by 10°, the strength is corrected by +5; or the quantity of shaking times exceeds a reference quantity of times by 2 times/second, the frequency is corrected by +2 Hz). Finally, the reference parameter is adjusted by using the correction coefficient to obtain final status data.

In an example, during toy sales live streaming, the second target object first taps "start vibration" by using the control panel, adjusts a strength slider to 50% (corresponding to strength 50), and selects the "continuous mode" (generating reference parameters: whether to vibrate=yes, strength 50, frequency 5 Hz, and continuous mode). In addition, the camera captures that a bending angle of a finger of the second target object pinching the toy is 60° (exceeding the reference angle 45° by) 15°, and the strength is corrected by +7.5 (15°/10°×5) based on the second mapping relationship. Finally, corrected parameters are output: whether to vibrate=yes, strength 57.5, frequency 5 Hz, continuous mode, and duration accumulated with vibration duration.

In practical application, parameter thresholds and mapping ratios of the first mapping relationship and the second mapping relationship in the foregoing process may be customized based on commodity features. In addition, another image recognition technology such as YOLO-Pose or MediaPipe may be alternatively used to extract the action feature. This is not limited in this embodiment.

Based on the foregoing implementation, a core presentation feature of the first target object can be extracted by parsing the manipulation behavior of the second target object and a multi-dimensional parameter can be generated without relying on a sensor or a communication function of the commodity, to adapt to a conventional toy or clothing commodity without an intelligent module, thereby effectively extending an applicable scope of the solution. In addition, a multi-signal fusion correction mechanism can take into account a control intention and action details, so that determining for the display status of the first target object is more accurate, and parameter generation better meets an actual demonstration requirement.

In another implementation, the live streaming device obtains the status data in the following manner: obtaining a preset status event script synchronized with a picture content timeline, where the status event script includes a real-time display status defined according to a time sequence; and querying a corresponding target display status from the status event script based on a current picture timestamp, and generating the status data based on the target display status.

Specifically, in this embodiment, before live streaming, the second target object creates the status event script of the first target object by using a background editing tool. The script uses a timestamp as a core index, and supports customizing fields based on the type of the first target object, to implement full-product adaptation. For an adult toy, each record includes fields of "timestamp (accurate to second), whether to vibrate (yes/no), vibration strength (level 0 to level 100), vibration frequency (1 Hz to 10 Hz), and vibration mode (continuous/intermittent/pulse)". For a clothing commodity, each record includes fields of "timestamp (accurate to second), display type (fabric/pattern/collocation), core parameter (such as fabric=cotton/elastic coefficient=85/collocation scenario=commuting), and key annotation area (such as cuff/waist/abdomen)".

In this embodiment, the script sequentially enters a status parameter of the first target object at each time point according to a live streaming procedure, and supports manual input, template import, or batch replication to improve editing efficiency.

After live streaming is started, a picture play timeline of the live streaming device is synchronized in real time with a timestamp of the preset status event script to ensure that execution progress of the script is consistent with picture content. The live streaming device reads a timestamp of a current picture once a second, and queries, in the status event script, a parameter record corresponding to the timestamp; and if a matched record is found, directly extracts a core parameter corresponding to the type of the first target object, and completes status data integration with reference to a parameter type; or if no matched record is found (for example, a time segment parameter is not defined in the script), continues to use a parameter of a previous record (for example, when the previous record is "whether to vibrate=no", the default parameter is "no, strength 0, frequency 0 Hz, and no mode"), until a next matched record is found, and then performs update.

In an example, during toy function demonstration live streaming, a preset vibration event script of the second target object includes three records: "00:01:00—whether to vibrate=yes—strength 60—frequency 6 Hz—continuous mode", "00:01:05—whether to vibrate=yes—strength 80—frequency 8 Hz—pulse mode", and "00:01:10—whether to vibrate=no—strength 0—frequency 0 Hz—no mode".

On this basis, when the live streaming is played to 00:01:02, the record corresponding to 00:01:00 is queried, and parameters are generated: whether to vibrate=yes, strength 60, frequency 6 Hz, continuous mode, and duration 2 seconds. When the live streaming is played to 00:01:07, the record corresponding to 00:01:05 is queried, and parameters are generated: whether to vibrate=yes, strength 80, frequency 8 Hz, pulse mode, and duration 2 seconds. When the live streaming is played to 00:01:12, the record corresponding to 00:01:10 is queried, and parameters are generated: whether to vibrate=no, strength 0, frequency 0 Hz, no mode, and duration 0 seconds.

In the foregoing implementation, a presentation status and a matching parameter of the first target object at each time point are determined by using the preset script. This can ensure that a status of the first target object is accurately synchronized with a live streaming rhythm, and is particularly applicable to a standardized function demonstration scenario (such as toy demonstration in a fixed procedure), thereby avoiding uncertainty of real-time collection, improving stability and repeatability of demonstration, and reducing complexity of real-time manipulation of the second target object.

In some other embodiments, the live streaming device obtains the status data in the following manner: obtaining at least one associated signal, where the associated signal includes an image signal from the picture video stream, a voice signal of a second target object, and a visual change signal of the first target object; and performing fusion analysis on the at least one associated signal based on a preset inference model, to determine the status data.

Specifically, in this embodiment, the inference model is a deep learning model based on multi-modal feature fusion, is trained in advance by using associated signals and presentation status parameter samples of massive first target objects of a plurality of categories, and can adaptively extract signal features and output corresponding parameters for different first target object types.

More specifically, in this embodiment, the live streaming device captures the picture video stream by using a camera; extracts an image signal of the second target object and a visual change signal of the first target object; and collects a voice signal of the second target object by using a built-in microphone. For the image signal, features such as coordinates, motion trajectories, and action amplitudes of 21 joint points of the hand are extracted by using a MediaPipe algorithm. For the visual change signal of the first target object, a commodity region is locked by using a YOLO algorithm, and features such as a deformation amplitude, a displacement speed, and a texture change in the region are calculated. The voice signal is converted into a text by using a speech recognition technology, and key semantic features such as "high frequency vibration", "cotton fabric", and "good elasticity" are extracted.

Then, the live streaming device inputs a pre-processed action feature, a visual change feature of the first target object, and a voice and semantic feature to a feature fusion module, and allocates dynamic weights to different signals by using an attention mechanism. For example, in an adult toy scenario, a weight of the action feature is 60%, a weight of the visual change feature of the first target object is 20%, and a weight of the voice feature is 20%. In a clothing scenario, a weight of the visual change feature of the first target object is 50%, a weight of the action feature is 30%, and a weight of the voice feature is 20%. Then, a fused feature vector is input to a core inference layer of the inference model.

Further, the inference model outputs corresponding status data for different first target object types based on a fused feature. For an adult toy, the model outputs parameters such as whether to vibrate, vibration strength, frequency, and mode. For example, when it is detected that "a finger continuously presses the toy+a small high-frequency displacement occurs in the commodity region+the second target object says 'start continuous vibration'", it is determined that "whether to vibrate=yes", and a finger pressing force is mapped to vibration strength of level 80. For a clothing commodity, the model outputs parameters such as display type, core parameter, and key annotation area. For example, when it is detected that "the hand of the second target object stretches the clothing fabric+the fabric region extends horizontally by 5 cm+the second target object says 'high-elasticity cotton'", "display type=fabric, core parameter=material=cotton, elastic coefficient=90, and key annotation area=stretching part" are output.

In this embodiment, to avoid a misjudgment caused by signal noise, the model updates the parameters every 30 milliseconds, and performs smoothing processing on a parameter result of the previous five frames. If a deviation between a current parameter and a historical mean exceeds a preset threshold (for example, a vibration strength deviation is ±20 level, and an elastic coefficient deviation is ±15), a signal feature is re-collected to perform secondary inference to ensure accuracy and stability of the parameter.

In the foregoing implementation, there is no need to rely on an intelligent component such as a sensor or a communication module that is built in the first target object. This breaks through a limitation on adaptation of an intelligent commodity in the conventional solution, and may be widely applied to a live display scenario of various commodities such as an adult toy, a conventional garment, and a handmade article without an intelligent module, thereby effectively extending an applicable scope. In addition, the inference model based on multi-modal feature fusion can integrate multi-dimensional signals such as a hand action, a voice, and a visual change of the first target object. Compared with a determining manner with a single signal, inference accuracy of the status data is greatly improved, and a parameter deviation caused by single signal noise or a false trigger is avoided. In addition, for a dynamic weight allocation mechanism for different first target object types, the model can accurately match presentation features and signal association logic of various commodities, so that a parameter output better meets live demonstration requirements of first target objects of different categories. The calibration mechanism of parameter smoothing processing and secondary inference further ensures parameter stability and continuity, so that visual content of the information buoy can reflect a display status of the first target object in real time and accurately, thereby improving live streaming viewing experience of the audience and information obtaining efficiency of the first target object.

In practical application, the status data may be alternatively obtained in another manner. For example, the hand action recognition in the second manner is combined with the preset script in the third manner. The script defines a trigger time point for vibration, and the hand action corrects strength and frequency parameters in real time. Alternatively, the user manually enters a typical vibration parameter combination of the toy in the system in advance (for example, gears "high/medium/low" corresponds to "whether to vibrate=yes+strength+frequency"). During live streaming, the user directly invokes the complete parameter by selecting a gear. Further, with reference to the sensor data in the first manner and the operation signal in the second manner, the sensor data may be used to determine whether to vibrate, and the operation signal may be used to correct the strength parameter. This is not limited in the embodiments.

S203. For any first target object, generate a corresponding information buoy by using the real-time position information as a spatial anchor, and overlay and render the information buoy onto a corresponding frame of the picture video stream.

Visual content of the information buoy dynamically reflects the status data and the attribute information. The information buoy specifically refers to a visual interaction element overlaid in the picture video stream, is presented in a form of a combination of a graphic, a text, an icon, and the like, is used to visually display the attribute information and the real-time status data of the first target object, and is dynamically bound to a real-time position of the first target object.

In this embodiment, for each first target object, a corresponding information buoy is generated by using real-time position information corresponding to the first target object as a spatial anchor. Specifically, the live streaming device first generates a main body graphic and a pointing graphic of the information buoy, where the main body graphic includes visual content of the attribute information and the status data of the first target object; and configures the pointing graphic, so that one end of the pointing graphic is connected to the main body graphic and another end points to the spatial anchor, to obtain the information buoy and establish a visual association between the main body graphic and the first target object.

More specifically, in this embodiment, when generating the information buoy for any first target object, the live streaming device first extracts core coordinates in the real-time position information of the first target object, such as two-dimensional pixel coordinates (X0, Y0) of a center point of a core region of the first target object, and uses the coordinates as a spatial anchor reference point of the information buoy. A rectangular semi-transparent floating box of a first preset size is used as a main body graphic carrier, and visual content is displayed by partition in the main body graphic. For example, the attribute information is displayed in an upper half region, and the status data is displayed in a lower half region by using a combination of text+graphic. For an adult toy, a toy model "XX-001" can be displayed in the upper half region. In the lower half region, a red dot (yes)/gray dot (no) indicates "whether to vibrate". The "vibration strength" is displayed in a progress bar (level 0-100 corresponds to filling 0%-100% of the progress bar), the "vibration frequency" is displayed by using number+unit (such as "5 Hz"), and the "vibration mode" is indicated by using a corresponding icon (continuous vibration is a straight line, intermittent vibration is a dotted line, and pulse vibration is a dot combination).

Subsequently, a triangular arrow of a second preset size is used as the pointing graphic, and a color of the arrow is consistent with a color of a frame of the main body graphic (for example, blue), a tip of the arrow is positioned to the spatial anchor reference point (X0, Y0), and a bottom edge of the arrow is fixedly connected to a bottom midpoint of the main body graphic, to ensure that the pointing graphic always points to a core position of the first target object, for example, a functional region of an adult toy or a display focus region of a garment.

Finally, the main body graphic is combined with the pointing graphic to generate a complete information buoy, and a shadow effect and a translucent attribute (for example, setting transparency to 70%) are added to the buoy to avoid blocking core content of the picture.

It should be understood that, in practical application, the first preset size and the second preset size may be flexibly configured according to a requirement. In addition, features such as a shape of the semi-transparent floating box, a partition display manner, an arrow shape, and a color may also be flexibly configured according to a requirement. Different first target object types may be adapted to specific buoy styles (for example, a 3C digital commodity uses a rounded rectangular buoy with a scientific sense, and a food commodity uses a round buoy with a warm tone). This embodiment is merely used as an example, and is not limited thereto.

Further, the live streaming device overlays and renders the information buoy onto a corresponding frame of the picture video stream. Specifically, the live streaming device first obtains a current frame image of the picture video stream, and records a timestamp of the frame, to ensure that generation time of the information buoy is consistent with the timestamp of the current frame, to avoid a time sequence mismatch. Then, the live streaming device determines an initial rendering position of the information buoy in a picture coordinate system based on the spatial anchor defined by the real-time position information; verifies the initial rendering position, and adjusts the initial rendering position according to a preset boundary avoidance rule when a partial or entire region of the information buoy exceeds a picture display boundary, so that an adjusted information buoy is completely located within the picture display boundary; and performs composite rendering on the information buoy located at an adjusted rendering position and a current frame image of the picture video stream. In addition, the live streaming device further needs to calculate a placement position of the main body graphic based on the spatial anchor reference point (X0, Y0) with reference to the picture size boundary.

The boundary avoidance rule refers to a position adjustment policy performed when the live streaming device detects that bounding box coordinates (Xmin, Ymin, Xmax, Ymax) of the main body graphic of the information buoy exceeds the picture display boundary (0, 0, W, H, where W is a picture width, and His a picture height). Specifically, the live streaming device first performs horizontal boundary detection. If it is detected that a left boundary (Xmin) of the main body graphic of the information buoy is less than 0, the information buoy is translated by |Xmin| pixels to the right. If it is detected that a right boundary (Xmax) of the main body graphic of the information buoy is greater than the picture width W, the information buoy is translated by (Xmax−W) pixels to the left.

After horizontal boundary adjustment is completed, the live streaming device continues to perform vertical boundary detection. If it is detected that an upper boundary (Ymin) of the main body graphic of the information buoy is less than 0, the information buoy is translated down by |Ymin| pixels. If it is detected that a lower boundary (Ymax) of the main body graphic of the information buoy is greater than the picture height H, the information buoy is translated up by (Ymax−H) pixels. When boundaries are exceeded in both horizontal and vertical directions, the live streaming device preferentially adjusts a position in the vertical direction to ensure that a visual connection (for example, the pointing graphic) between the information buoy and the first target object is not stretched excessively. In addition, on the premise that a boundary constraint is satisfied, the live streaming device follows a minimum offset principle, that is, an offset between an adjusted position and an initial position is minimum, to maintain natural buoy following.

More specifically, the live streaming device places the main body graphic at a position 50 pixels above the anchor reference point by default. If the position exceeds the upper boundary of the picture, the position is automatically adjusted to a position 50 pixels below the anchor, to ensure that the buoy is completely located within the picture. For example, if core coordinates of the target toy in the current frame are (960, 540), picture resolution is 1920×1080, and the default placement position of the main body graphic is (900, 410), which does not exceed the picture boundary, the live streaming device overlays the information buoy onto the current frame based on the position. When the toy moves to coordinates (960, 100), and a default position (900, −30) exceeds the upper boundary, the position is automatically adjusted to (900, 150) and rendering is completed, to ensure that the buoy always follows the toy and is fully displayed.

Then, the live streaming device performs composite rendering on the information buoy located at the adjusted rendering position and the current frame image of the picture video stream in a transparency blending manner. For example, by using an Alpha hybrid rendering technology, a composite information buoy is used as an independent translucent layer, and is overlaid onto a background layer corresponding to the current frame image. In addition, a layer display priority is configured, so that a priority of the information buoy layer is higher than that of the background layer, but lower than that of a layer at which a main body of the first target object is located. In this way, the information buoy can be ensured to be clearly visible, and the first target object can be prevented from being blocked by the information buoy, thereby optimizing visual experience.

In this embodiment, the live streaming device repeats the foregoing position calibration-overlay and rendering step on each frame of the picture video stream, so that the information buoy moves synchronously with a real-time position change of the first target object, thereby implementing dynamic binding between the buoy and the first target object.

It should be understood that, preferably, the foregoing pointing graphic is also dynamically adjusted based on the real-time position information of the first target object. When the first target object moves, rotates, or has a posture change, the pointing graphic synchronously responds to a position update instruction, and corrects a pointing angle and an offset distance in real time to ensure that the pointing graphic always accurately points to the core region of the first target object, thereby avoiding a problem such as a pointing lag or deviation.

It should be understood that, in practical application, when the information buoy is generated, the pointing graphic may not be set, but the main body graphic of the information buoy is directly bound to the bounding box of the first target object, so that the main body graphic always fits a side of the bounding box of the first target object (for example, at a position 20 pixels to the right). Alternatively, a 3D stereo buoy style is used to form a spatial hierarchical sense between the buoy and the picture by using a perspective projection technology. This is not limited in this embodiment.

In addition, in practical application, in addition to the Alpha hybrid rendering technology, a color keying rendering technology and a hardware acceleration rendering technology may be alternatively used to implement overlay and rendering of the information buoy. The color keying rendering technology completes fusion of the buoy and a video frame by recognizing a preset color keying region in the picture, and adapts to a live streaming scenario with a single background. The hardware acceleration rendering technology completes real-time composition of a buoy layer by using a graphics processing unit of a graphics card, can greatly improve rendering efficiency, and is applicable to a live streaming scenario with a high frame rate. Different rendering technologies may be flexibly selected according to computing power of the live streaming device and a scenario requirement. This is not limited in this embodiment.

In this embodiment, a strong visual association between the information buoy and the first target object is established by using a design of core coordinate anchor+pointing graphic connection, and the user can intuitively recognize the specific first target object corresponding to the buoy, thereby resolving a conventional problem that an annotation is not aligned with a commodity. In addition, an abstract vibration parameter is converted into an intuitive visual element by using a visual combination of text+graphic of the main body graphic, thereby reducing information understanding costs of the user. In addition, a buoy position automatic calibration mechanism avoids a case in which the buoy exceeds the picture or blocks core content, thereby ensuring integrity of picture display. Frame synchronization alignment and dynamic following rendering ensure real-time synchronization of the buoy with the position of the first target object and the picture frame, thereby further improving accuracy and smoothness of information transfer, and providing a visual basis for interaction enhancement.

In a further preferred design, in this embodiment, for any information buoy, the live streaming device establishes a mapping relationship between at least one numerical value of the status data and at least one corresponding visual dynamic parameter; and drives, based on the mapping relationship, the information buoy to perform dynamic rendering, where the visual dynamic parameter includes at least one of dynamic effects of the information buoy, and the dynamic effects include an occupied area, a color value, a flicker frequency, a position jitter amplitude, a virtual object, a virtual character, a countdown timer, a preset special effect, or a dynamic widget.

Specifically, the occupied area refers to a size of a pixel region occupied by the main body graphic of the information buoy in the picture, and can be scaled by adjusting a pixel value of a buoy width and height. The color value refers to a color parameter of a main body of a border of the information buoy, can be represented by using color spaces such as RGB or HSV, and supports a gradual transition of the color. The flicker frequency refers to a quantity of times that the information buoy completes a display-hide cycle in unit time, and is used to indicate a status change or attract attention. The position jitter amplitude refers to a maximum pixel distance at which the information buoy moves back and forth with a small amplitude around the anchor (which is usually the position of the first target object in the picture) of the information buoy, and is used to simulate a dynamic effect such as vibration or swing.

Specifically, the virtual object refers to a computer-generated graphic, image, or video segment associated with the first target object, and may be extracted from a model library and vary with a status parameter. The virtual character refers to a computer-generated model that is used to imitate an action of the second target object or display an effect of the first target object, and an action of the virtual character may be obtained from an animation library or may be driven based on real-time data. The countdown timer refers to a dynamic number or graphic element that displays specific status duration, and is used to prompt the user with status end time. The preset special effect refers to a preset dynamic visual effect used to enhance visual performance, such as sound wave fluctuation, a light and shadow change, and a particle special effect, and may be extracted from a special effect library. The dynamic widget refers to a temporary interface element that pops up when a specific interaction event is triggered, such as an operation button, a parameter adjustment slider, and a status prompt box, and is used to implement interaction between the user and live streaming content.

Based on this, in this embodiment, a mapping relationship between each display status parameter in the status data and a visual dynamic parameter is established in the system in advance, and the mapping relationship is used to associate a continuous or discrete change of the status data with a change of at least one visual dynamic parameter (such as a size, a color, a transparency, and a flicker frequency) of the information buoy. For an adult toy, the mapping relationship may include a correspondence rule between vibration strength and an occupied area. For example, strength at level 0-30 corresponds to a main body graphic area of 120×80 pixels, level 31-60 corresponds to an area of 140×90 pixels, and level 61-100 corresponds to an area of 160×100 pixels. The mapping relationship may include a correspondence rule between vibration strength and a color value. For example, strength at level 0-30 corresponds to green (RGB value: 0, 255, 0 to 100, 255, 0), level 31-60 corresponds to yellow (RGB value: 255, 255, 0 to 255, 200, 0), and level 61-100 corresponds to red (RGB value: 255, 150, 0 to 255, 0, 0). The mapping relationship may include a correspondence rule between the vibration frequency and the flicker frequency. For example, the frequency 1-3 Hz corresponds to the buoy flicker frequency 1 time/second, the frequency 4-7 Hz corresponds to the flicker frequency 2 times/second, and the frequency 8-10 Hz corresponds to the flicker frequency 3 times/second. The mapping relationship may include a correspondence rule between the vibration mode and the position jitter amplitude. For example, the continuous mode corresponds to the jitter amplitude of 0 pixels (no jitter), the intermittent mode corresponds to the jitter amplitude of 5 pixels, and the pulse mode corresponds to the jitter amplitude of 10 pixels.

For a clothing commodity, the mapping relationship may include a correspondence rule between the elastic coefficient and the occupied area. For example, the elastic coefficient 0-30 corresponds to a main body graphic area of 120×80 pixels, 31-60 corresponds to an area of 140×90 pixels, and 61-100 corresponds to an area of 160×100 pixels. The mapping relationship may include a correspondence rule between the air permeability and the color value. For example, air permeability 0-30 corresponds to gray (RGB values: 150, 150, 150 to 200, 200, 200), 31-60 corresponds to blue (RGB values: 0, 100, 255 to 0, 150, 255), and 61-100 corresponds to sky blue (RGB values: 0, 200, 255 to 0, 230, 255). The mapping relationship may include a correspondence rule between the display type and the flicker frequency. For example, fabric display corresponds to the flicker frequency 0 times/second (no flicker), pattern display corresponds to the flicker frequency 1 time/second, and collocation display corresponds to the flicker frequency 2 times/second. The mapping relationship may include a correspondence rule between the fabric stretching amplitude and the position jitter amplitude. For example, the stretching amplitude 0-5 cm corresponds to the jitter amplitude of 0 pixels, 6-10 cm corresponds to the jitter amplitude of 5 pixels, and 11 cm or above corresponds to the jitter amplitude of 10 pixels.

On this basis, when obtaining the real-time status parameter of the first target object, the live streaming device determines a corresponding visual dynamic parameter based on the foregoing mapping relationship, and performs real-time rendering adjustment on the information buoy based on the visual dynamic parameter. For example, the main body graphic is scaled according to a corresponding area, the buoy color is updated according to a color value, the display-hide cycle of the buoy is controlled according to the flicker frequency, and the buoy is controlled to move back and forth with a small amplitude around the anchor according to the jitter amplitude. In addition, in this embodiment, a smooth transition algorithm, such as linear interpolation, is used in a dynamic adjustment process, to avoid a buoy display lag caused by a sudden change of the parameter.

In an example, when the vibration strength of the adult toy increases from level 50 to level 80, the live streaming device smoothly scales the area of the information buoy from 140×90 pixels to 160×100 pixels based on the mapping relationship, and the color gradually changes from yellow (255, 220, 0) to red (255, 30, 0). If the vibration frequency increases from 3 Hz to 9 Hz, the flicker frequency of the buoy synchronously increases from 1 time/second to 3 times/second, so that the user intuitively perceives the dynamic adjustment of the vibration parameter by using the visual change of the buoy. For another example, when the elastic coefficient of the garment increases from level 45 to level 85, the information buoy area is smoothly scaled from 140×90 pixels to 160×100 pixels, the air permeability is increased from 55 to 90, and the buoy color gradually changes from blue (0, 150, 255) to sky blue (0, 220, 255), so that the user can intuitively perceive a fabric characteristic change of the garment.

In an example, for the adult toy, when the vibration strength reaches level 50, a rotational dynamic icon is extracted from a model library as a virtual object, and an icon size synchronously increases by 20% to level 80 with the strength. Virtual character animation is synchronously invoked from a feature library, a limb swing amplitude of the virtual character increases with the strength, and an animation action frame is obtained from a preset sequence in an animation library. If the vibration is triggered by tipping of a viewer, the buoy synchronously displays the countdown timer. The countdown duration is bound to the tip amount (for example, 5 tokens correspond to 5 seconds), and the value color gradually changes from initial green to red as the remaining time decreases. When the vibration mode is the pulse mode, the special effect of sound wave fluctuation in the special effect library is matched, and the fluctuation frequency is consistent with the pulse frequency. When an interaction instruction for switching the vibration mode is received, the buoy pops up a dynamic widget that includes all mode options in the control mode library, and the widget is automatically hidden after 5 seconds without operation.

In practical application, the foregoing process may be alternatively implemented in another manner. For example, a mapping relationship between a vibration parameter and a thickness and transparency of a buoy bounding box is established for an adult toy (higher strength indicates a thicker bounding box and lower transparency). Alternatively, a dynamic particle effect is added (higher vibration strength indicates a larger quantity of particles around the buoy). For example, for a clothing commodity, a mapping relationship between a pattern size and a buoy bounding box style is established (a loose pattern corresponds to a dotted line bounding box, and a fit pattern corresponds to a solid line bounding box). Alternatively, a fabric texture dynamic projection effect is added (a buoy background displays a corresponding texture pattern when the fabric is displayed). This is not limited in this embodiment.

In this embodiment, a mapping relationship between a value of each status parameter in the status data and a visual dynamic parameter is established, so that the information buoy can not only statically display a parameter, but also visually reflect real-time fluctuation of the display status parameter of the first target object by using a dynamic change of the area, the color, the flicker, the jitter, or the like, so that the user can quickly perceive a change of the status of the first target object such as an adult toy vibration status or a clothing fabric, without reading a text. In addition, dynamic visual feedback is more attractive than static display, which can effectively attract user attention and improve user focus on the status of the first target object. In addition, dynamic rendering of smooth transition avoids a visual abrupt feeling, and ensures smoothness of a picture impression. In addition, a multi-dimensional visual dynamic parameter combination can fully transfer the display status information of the first target object, further reduce user cognition costs, and enhance associated cognition for buoy-first target object-status, thereby effectively improving intuition and immersion of live streaming interaction.

According to the picture content enhancement method provided in this embodiment of this application, at least one first target object is recognized and tracked based on a picture video stream, to obtain attribute information and real-time position information of the first target object; status data associated with the first target object is obtained; and then for any first target object, a corresponding information buoy is generated by using the real-time position information as a spatial anchor, and the information buoy is overlaid and rendered onto a corresponding frame of the picture video stream.

According to the picture content enhancement method in this embodiment, an abstract and invisible real-time status parameter is successfully converted into an information buoy that is accurately locked in the spatial position of the visual image of the first target object and dynamically linked in terms of visual representation. This technical means radically resolves a core problem that status information is separated from a visual subject, so that the audience does not need to switch attention back and forth between the first target object entity and a separated text or voice introduction, and a direct cognitive channel of "what you see is what you get" can be established. Therefore, zero delay and immersive visual perception of a dynamic working status of the first target object is implemented, thereby effectively improving information transfer efficiency of picture content, interaction intuition, and overall viewing immersion, and further facilitating the audience to participate in interaction behavior such as posting a comment, tipping, and giving a like.

Figure 3:
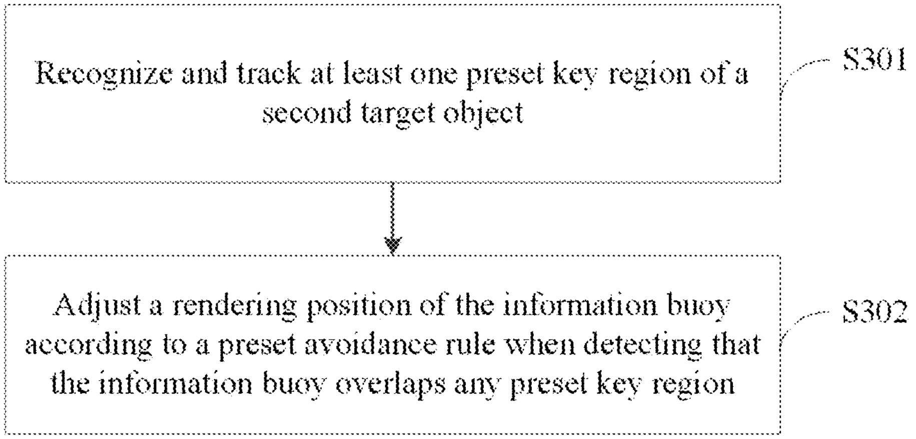
FIG. 3 is a schematic flowchart 2 of a picture content enhancement method according to this application.

This application further provides an embodiment of a picture content enhancement method. FIG. 3 is a schematic flowchart 2 of a picture content enhancement method according to this application. As shown in FIG. 3, on the basis of the embodiment in FIG. 2, a specific manner of overlaying and rendering the information buoy onto the corresponding frame of the picture video stream is described in detail in this embodiment. The method includes the following steps.

S301: Recognize and track at least one preset key region of a second target object.

The second target object is an operator that controls the first target object or performs commodity demonstration in a picture scenario. For details, refer to the description in the foregoing embodiment. Details are not described herein again. The preset key region is a region that is associated with display of the first target object and to which the second target object belongs. In this embodiment, the preset key region specifically includes a hand (such as a finger or a palm), an arm, a face, a chest, a leg, and the like. These regions are visual focal points when the user watches. If these regions are blocked, viewing experience is severely affected. It should be understood that the virtual character also includes the foregoing corresponding preset key region. Specifically, dynamic adaptation may be performed based on a display form of the virtual character (for example, a hand and a face of an anthropomorphic virtual character, and a core display limb segment of a cartoon virtual character).

In this embodiment, a real-time position of the foregoing part is recognized and tracked. On one hand, a control intention and action details of the second target object for the commodity can be accurately captured to provide an operation basis for associating the display status of the first target object and optimizing information buoy display. On the other hand, a demonstration posture (such as a face orientation and a body position) of the second target object may be determined by using a position relationship and a posture change of a core part, to adjust the rendering position (such as avoiding blocking the face) or a display priority of the information buoy, and provide extension support for multi-scene interaction (such as triggering toy vibration mode switching with reference to a leg action), so that the picture content is enhanced to better match demonstration logic of the second target object and viewing experience of the user.

In this embodiment, the live streaming device dynamically determines a real-time position of the preset key region based on the picture video stream and/or pre-obtained action data associated with the second target object. The picture video stream is a consecutive-frame image sequence that is captured in real time by using the image capture module (such as a camera) of the live streaming device and that includes the second target object and the first target object, and is a core data source for capturing an action of the second target object and a scene picture. The pre-obtained action data associated with the second target object refers to action-related data that is corresponding to the second target object in a demonstration scenario of the first target object of a same type and that is obtained in a manner such as historical live streaming recording or advanced demonstration collection before the current picture content enhancement procedure is started, including but not limited to historical motion trajectory coordinates, an action execution time sequence, a posture change rule, a typical action sequence template, and the like of each preset key region, and is used to assist in improving accuracy and continuity of determining the real-time position.

Specifically, in some embodiments, the live streaming device dynamically determines the real-time position of the preset key region based on the picture video stream: The live streaming device performs frame-by-frame processing on the picture video stream by using a posture recognition algorithm based on a pre-trained multi-part detection model, and directly outputs coordinates of each preset key region in an image.

More specifically, a posture recognition algorithm (for example, MediaPipe Pose or YOLO-Pose) is used to perform frame-by-frame processing on the live video stream, core coordinates of each preset key region (for example, a fingertip joint point of the hand, center coordinates of the face, a sternum position of the chest, and a knee joint point of the leg) are determined from the image by using the pre-trained multi-part detection model (sample features such as a hand, a face, a chest, and a leg have been annotated), and real-time position information represented by picture two-dimensional pixel coordinates is directly output.

In some other embodiments, the live streaming device dynamically determines a real-time position of the preset key region based on the action data associated with the second target object: The live streaming device obtains a preset standard action sequence corresponding to current live streaming content, and maps and reads corresponding standard position coordinates from the preset standard action sequence as the real-time position based on current moment. The preset standard action sequence is used to indicate standard position coordinates of at least one preset key region at each time point of the demonstration procedure.

More specifically, the preset standard action sequence is a data template that is strictly bound to a timeline and that is generated through fine annotation based on a demonstration video recorded by a high-precision action capture system in advance in an unshielded and stable environment. The template is stored in a form of a key value pair or a data structure of timestamp-coordinate mapping table. A time point is a key, and a set of standard position coordinates of all preset key regions corresponding to the time point in a unified manipulation coordinate system is a value.

In a live streaming process, a timer or a video stream decoder in the live streaming device generates an absolute timestamp or a relative timestamp precisely corresponding to the current video frame. The system queries and matches a preset standard action sequence database by using the timestamp as an index. When a completely matched time point is found, a corresponding standard position coordinate set is directly read. When no completely matched time point (for example, between two key frames) is found, interpolation coordinates of the current time point are calculated based on standard coordinates of two adjacent time points by using a linear interpolation algorithm. Finally, the coordinates obtained through reading or calculation are output as real-time position information of the current frame.

In some other embodiments, the live streaming device dynamically determines a real-time position of the preset key region based on the picture video stream and pre-obtained action data associated with the second target object: The live streaming device obtains first real-time position information based on the picture video stream; obtains second real-time position information based on the pre-obtained action data associated with the second target object; and performs fusion processing on the first real-time position information and the second real-time position information according to a preset fusion rule, to output a final real-time position.

More specifically, the fusion processing includes at least one of the following manners: when it is recognized, based on the picture video stream, that the at least one preset key region is blocked, using the second real-time position information as a final real-time position of a blocked part; performing weighted averaging on the first real-time position information and the second real-time position information to use a calculation result as a final real-time position; and matching the first real-time position information with a standard action template constructed based on the action data, and optimizing the first real-time position based on a matching result, for use as a final real-time position.

In practical application, a real-time position of the preset key region may be alternatively determined through multi-device collaborative recognition. For example, with reference to a camera (capturing a picture feature) of the live streaming device and an intelligent wearable device (such as a smart watch, a name badge, and leggings with a built-in position sensor) worn by the second target object, the wearable device collects spatial position data of a part such as the chest and the leg in real time, and transmits the spatial position data to the live streaming device through Bluetooth, for fusion and calibration with a picture recognition result, to finally output high-precision real-time position information. This manner is particularly applicable to a scenario in which a key part is easily blocked and light on the picture is insufficient. This is not limited in the embodiments.

It should be understood that, based on the real-time recognition manner of the picture video stream, positions of a plurality of key parts such as the hand, the face, the chest, and the leg can be synchronously captured only by using an algorithm without relying on an additional wearable device. Adaptability is high and there are no additional operation costs, a manipulation action and a demonstration posture of the second target object can be reflected in real time to ensure synchronization between position information and picture content, and provide basic data for multi-dimensional picture enhancement logic. A prediction and supplementary mechanism based on historical data resolves a problem that some key parts (such as the leg and the hand) are easily blocked. Continuity of position information is maintained through motion rule estimation, to avoid interruption of subsequent buoy rendering and interaction logic due to local blocking, thereby improving solution stability. Matching and positioning are performed based on the preset action sequence, positioning precision of the key part is enhanced by using regularity of a standardized demonstration action, especially in a multi-part collaborative demonstration scenario (for example, a use scenario in which a toy is manipulated by the hand and the leg cooperates for display), thereby reducing a recognition error caused by background interference or an action deviation.

Further, combined application of a plurality of manners not only covers overall recognition of an operation core part (the hand and the arm) and a posture representation part (the face, the chest, and the leg), but also takes into account real-time performance, stability, and precision. This not only provides reliable support for display status association of the first target object and buoy position optimization, but also reserves space for subsequently extending multi-part linked interaction (for example, a buoy display angle is adjusted based on a face orientation, or a vibration mode is switched with reference to a leg action), thereby further improving intelligence and scenario adaptation of picture content enhancement.

In the foregoing process, on one hand, a technology path may be flexibly selected according to a requirement of an actual application scenario. In a case without additional device support, real-time recognition and tracking of the key part can be implemented based on the live video stream by using a posture recognition algorithm, and the real-time position can be predicted and calibrated with reference to preset historical action data or an action sequence template in a complex scenario such as occlusion or poor light, without being limited to a single technical solution, thereby adapting to different hardware conditions and scenario requirements. On the other hand, the real-time position of each preset key region is dynamically determined, and a posture distribution and a demonstration posture of the second target object can be accurately obtained. For example, after picture coordinates of core representation parts such as the face and the chest are obtained in real time, a rendering region of the information buoy can be automatically adjusted, to avoid the key parts that the user focuses on, thereby avoiding that the buoy blocks key picture content such as a facial expression and a demonstration action of the second target object, so that the user can not only clearly perceive visual information of the display status of the first target object, but also can completely view the demonstration process of the second target object. This further optimizes rationality and viewing experience of picture display, and provides more comprehensive support for interaction improvement.

S302. Adjust a rendering position of the information buoy according to a preset avoidance rule when detecting that the information buoy overlaps any preset key region.

In this embodiment, the live streaming device calculates an intersection over union between a rendering region of the information buoy and a predetermined region constructed based on a real-time position of the preset key region; and if the intersection over union is greater than zero, determines that there is an overlap.

The intersection over union is a quantization indicator used to measure a degree of overlapping between two regions, and specifically refers to a ratio of an intersection area between the rendering region of the information buoy and the predetermined region of the preset key region to a union area between the two regions. A value range of the intersection over union is 0 to 1. When the value is 0, it indicates that there is no overlap between the two regions. When the value is greater than 0, it indicates that there is an overlap between the two regions. When the value is closer to 1, it indicates that the degree of overlapping between the two regions is higher.

Specifically, the live streaming device determines, through bounding box collision detection, whether the information buoy overlaps the preset key region. The live streaming device separately generates minimum bounding rectangle bounding boxes (coordinates of the upper left corner and the lower right corner of the bounding box are defined based on picture pixel coordinates) for the information buoy and each preset key region, and calculates an intersection area of the two types of bounding boxes. If the intersection area is greater than a preset threshold (for example, 5 pixels×5 pixels), it is determined that there is an overlap, a position adjustment mechanism is triggered, and position adjustment is performed according to a preset avoidance rule.

In practical application, it may be alternatively determined, through pixel coverage detection, whether the information buoy overlaps the preset key region. Specifically, regions of the information buoy and the preset key region in the picture are converted into pixel sets (each pixel is uniquely identified by using a coordinate value), and a proportion of a quantity of overlapping pixels in the two sets to a total quantity of pixels of the information buoy is counted. If the proportion exceeds a preset threshold (for example, 10%), it is determined that there is an overlap. This manner can more precisely reflect an overlapping degree, and is particularly applicable to a scenario in which the buoy is not rectangular or a form of the key part is irregular. This is not limited in the embodiments.

In this embodiment, for each first target object, the live streaming device adjusts the rendering position of the information buoy according to the following avoidance rule: predefining a plurality of candidate positions around the spatial anchor; selecting a target candidate position that overlaps none of all preset key regions from the candidate positions; and determining a target rendering position of the information buoy from the target candidate position according to a preset order.

Specifically, in this embodiment, the live streaming device uses the spatial anchor (target toy core coordinates X0, Y0) as a center, and predefines eight candidate positions in up, down, left, and right directions, for example, 50 pixels above, 100 pixels above, 50 pixels below, 100 pixels below, 50 pixels on the left, 100 pixels on the left, 50 pixels on the right, and 100 pixels on the right. Each candidate position corresponds to the upper left corner coordinates of the main body graphic of the information buoy. For each candidate position, the bounding box of the information buoy is generated and collision detection is performed with bounding boxes of all the preset key regions. An overlapping candidate position is excluded, and the remaining is the target candidate position.

In this embodiment, a preset order is "up>down>right>left", and a position closer to the anchor in a same direction has a higher priority (for example, 50 pixels above>100 pixels above). A position that is closer to the toy and that does not easily block the line of sight of the user is preferentially selected.

In practical application, the target candidate position may be alternatively selected by dynamically extending a candidate region. For example, starting from the anchor, a candidate range is gradually expanded by using a step size of 20 pixels, a new candidate position is generated each time expansion is performed, and overlapping is detected, until no overlapping position is found. In addition, the preset order may be alternatively set based on picture hot zone analysis. For example, a position around a picture center region focused by the line of sight of the user is set to a high priority, and an edge region is set to a low priority. This is not limited in this embodiment.

In this embodiment, an overlapping risk between the buoy and the key part can be accurately recognized through bounding box collision detection, to avoid that the buoy blocks a region that is focused by the user, such as an operation hand and the face of the second target object. In addition, candidate position predefinition is used in combination with priority screening to ensure that position adjustment is efficient and has a clear rule, thereby avoiding user cognition confusion caused by irregular movement of the buoy.

In addition, in this embodiment, by preferentially selecting the position close to the anchor, it is ensured that the visual association between the buoy and the first target object is not weakened, and a problem of a conflict between information presentation and picture integrity is resolved, so that the user can clearly obtain the display status information of the first target object, and can completely observe the demonstration action and posture expression of the second target object, thereby improving overall impression and information transfer efficiency of the picture content.

In a further preferred design, when the live streaming device recognizes at least two first target objects, the live streaming device establishes a global layout constraint, and performs synchronous calculation and allocation on a rendering position of each information buoy based on the global layout constraint. The global layout constraint includes that an overlap rate between information buoys is less than a first preset value, and an overlap rate between each information buoy and each preset key region is less than a second preset value.

Specifically, in this embodiment, for each first target object, a respective candidate position list is generated according to the foregoing single buoy adjustment logic, and a buoy ID corresponding to each candidate position is marked. The live streaming device constructs a global layout optimization model, uses "an inter-buoy overlap rate is less than a first preset value, an overlap ratio between a buoy and a key part is less than a second preset value, and a sum of distances from the buoys to the anchor is minimum" as an objective function, and uses candidate positions of all buoys as a variable.

The first preset value and the second preset value may be set according to a requirement, and specific values of the first preset value and the second preset value are not limited in this embodiment. The overlap rate is an indicator used to quantize a degree of overlapping between two regions. A specific calculation manner is as follows: a ratio of an intersection area of the two regions to a total area of either of the regions. In this embodiment, a total area of the information buoy is preferably used as a denominator. A calculation formula is as follows: overlap rate=(intersection area between an information buoy region and another buoy region/a preset key region)÷total information buoy area×100%. A value range of the overlap rate is 0-100%. When the value is 0, it indicates that there is no overlap between the two regions. A larger value indicates a higher overlapping degree. In the global layout constraint, by controlling the overlap rate within the preset threshold, it can be ensured that the information buoy does not affect information transfer and viewing experience due to mutual blocking or blocking of the preset key region.

Further, in a specific implementation, a priority-based greedy allocation policy may be used. First, a buoy allocation sequence is determined based on a distance between each first target object and a picture edge or another preset rule (for example, a size of a toy). Then, each buoy is sequentially allocated, in this order, a candidate position whose priority is the highest and whose overlap rates with an allocated buoy and all the preset key regions are less than a corresponding preset value. If a best position is not available, a second best position is selected in order, until positions meeting the global layout constraint are found for all buoys.

In the foregoing allocation process, if a valid position cannot be found for all buoys due to insufficient candidate positions (for example, when a plurality of buoys are densely distributed), a conflict resolution mechanism is started. For example, equal scale processing is performed on some or all buoys (for example, an area is uniformly reduced to 80% of the original size), and then the foregoing allocation procedure is re-performed based on the scaled buoy size, to ensure compliance of the global layout.

It should be understood that the foregoing greedy allocation policy is only an efficient approximate solution. In practical applications, other optimization algorithms that can search for global optimal solutions, such as a simulated annealing algorithm or a genetic algorithm, may be alternatively used. The simulated annealing algorithm is used as an example. A solution process may be briefly described as follows: An initial buoy position allocation solution is randomly generated, and an adaptation evaluation value of the solution is comprehensively calculated by using factors such as a total overlapping area between all buoys, a total overlapping area between the buoys and key parts, and a total distance between all the buoys and a spatial anchor. Then, the algorithm is iteratively optimized by a cooling process, the current solution is randomly perturbed at each step (such as randomly switching a candidate position of a buoy), and a best solution or a temporarily inferior solution is accepted according to a specific probability rule, thereby effectively jumping out of the local optimum, and finally obtaining a global layout solution that satisfies all constraints and has a better comprehensive evaluation value.

In addition, in practical application, a partition layout solution may be alternatively used to implement a global constraint. For example, the picture is divided into four regions, that is, an upper left region, an upper right region, a lower left region, and a lower right region. A dedicated region is assigned to a buoy of each target toy, and local position adjustment is performed in the region to avoid cross-region overlapping. This is not limited in the embodiments.

In this embodiment, a problem that buoys block each other in a scenario of a plurality of first target objects is resolved by using the global layout constraint, and each buoy has independent display space as much as possible through synchronous calculation, thereby avoiding user confusion caused by information overlapping. In addition, the setting of the minimum sum of the distances to the anchor in the objective function ensures an association between each buoy and a corresponding toy, and the user can quickly match the buoy-first target object correspondence. In addition, a scaling processing mechanism in a conflict case improves fault tolerance of the solution, so that clarity of information display can be maintained even in a scenario in which the first target objects are densely distributed, and picture cleanliness and information transfer efficiency in a multi-target scenario are further optimized.

In the method provided in this embodiment, on the basis of recognizing and tracking the first target object and generating the information buoy, recognition and tracking of the preset key region of the second target object are added. When the information buoy overlaps the key part, the rendering position of the buoy is adjusted through candidate position predefinition and priority screening. The global layout constraint is further established in a scenario of a plurality of first target objects, so that there is no overlap between the buoys and between the buoy and the key part as far as possible.

According to the method in this embodiment, it can be ensured that the information buoy is strongly associated with the first target object, and the buoy is prevented as much as possible from blocking the key part of the second target object or another buoy, thereby resolving a contradiction between information visualization and picture integrity and parallel display of multiple information. In addition, the dynamic avoidance mechanism allows the buoy position to better match a viewing habit of the user, reducing an information obtaining barrier caused due to blocking. The global layout constraint provides an orderly information display solution for a scenario of a plurality of first target objects, improves information transfer efficiency and picture impression in a complex scenario, and finally further optimizes user experience based on enhanced interaction, so that picture content enhancement is more intelligent and better meets actual application requirements.

Figure 4:
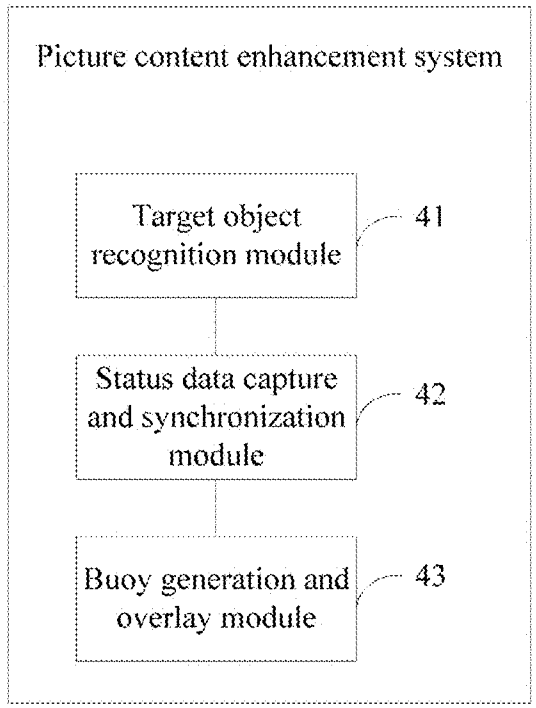
FIG. 4 is a schematic diagram of a structure of a picture content enhancement system according to this application.

This application further provides a picture content enhancement system. FIG. 4 is a schematic diagram of a structure of a picture content enhancement system according to this application. As shown in FIG. 4, the system includes:

a target object recognition module 41, configured to recognize and track at least one first target object based on a picture video stream, to obtain attribute information and real-time position information of the first target object;

a status data capture and synchronization module 42, configured to obtain status data associated with the first target object; and a buoy generation and overlay module 43, configured to: for any first target object, generate a corresponding information buoy by using the real-time position information as a spatial anchor, and overlay and render the information buoy onto a corresponding frame of the picture video stream, where visual content of the information buoy dynamically reflects the status data.

The picture content enhancement system of this application implements, through a modular design, automatic processing of a complete procedure of first target object recognition-status data obtaining-buoy visualization. The modules have clear tasks and collaborate: The target object recognition module accurately locks the position and the attribute of the first target object, and provides a basis for buoy binding. The status data capture and synchronization module obtains real and real-time status display parameters by using a plurality of adaptation solutions to ensure information accuracy. The buoy generation and overlay module converts the abstract parameter into intuitive visual information to implement dynamic binding with the first target object.

The foregoing modular architecture not only ensures efficient running of each step, but also flexibly replaces or upgrades a single module (such as replacing a vibration data obtaining manner or optimizing a buoy visualization effect) according to an actual scenario, and adapts to different first target object types and picture scenarios. In addition, the system can complete real-time information processing and visualization without manual intervention, which greatly reduces a threshold for use by an operator, effectively resolves a problem of information misalignment and inefficient perception in a conventional manner, enables the user to obtain a commodity display status intuitively and quickly, and effectively improves picture content interaction and viewing experience.

It should be understood that each module of the foregoing system may be an independent entity apparatus (such as a dedicated image recognition device, a data collection terminal, or a rendering processing unit), or may be a virtual functional module (such as an algorithm module or a functional subprogram implemented by using a software program) integrated into a same electronic device. This is not limited in this application.

When each module is an independent entity apparatus, high-speed data interaction and collaboration between the modules may be implemented by using a standardized interface (such as USB3.0, HDMI, Wi-Fi6, and Bluetooth BLE5.3), to form a specialized hardware deployment solution.

On this basis, in an example, the target object recognition module uses an independent terminal integrating a high-definition image capture unit and a dedicated AI chip (such as an FPGA or an edge computing box), and can improve a response speed of first target object recognition and tracking by using hardware, avoid a performance loss caused by sharing a hardware resource with another module, and adapt to a picture video stream processing scenario with a high frame rate and high resolution.

The status data capture and synchronization module uses an independent data collector as a carrier, has a built-in high-performance microcontroller and a multi-protocol communication module, and can directly establish a stable connection to the sensor module of the first target object, accurately collect and parse vibration data, and ensure, by using a timestamp synchronization mechanism, timing consistency between the data and the picture video stream.

The buoy generation and overlay module is configured with dedicated graphics rendering hardware (such as an embedded GPU or a graphics workstation). Information buoy generation, position calibration, and layer superimposition are quickly completed by using a hardware-level graphics processing capability, to avoid a delay or a lag caused by software rendering, and ensure smooth output of an enhanced picture.

In the foregoing deployment form of the independent entity apparatus, not only running stability and data processing efficiency of each module can be improved through hardware isolation, but also a single module can be flexibly expanded or replaced according to an actual application requirement (for example, the rendering module is upgraded to support a more complex buoy dynamic effect, and a data collection module is added to adapt to a scenario in which a plurality of first target objects are collected simultaneously). This is particularly applicable to a specialized scenario having high performance and stability requirements, such as live streaming for a large-scale commodity launching conference, professional product test and evaluation, and function demonstration for an industrial commodity, and provides reliable hardware support for picture content enhancement.

Figure 5:
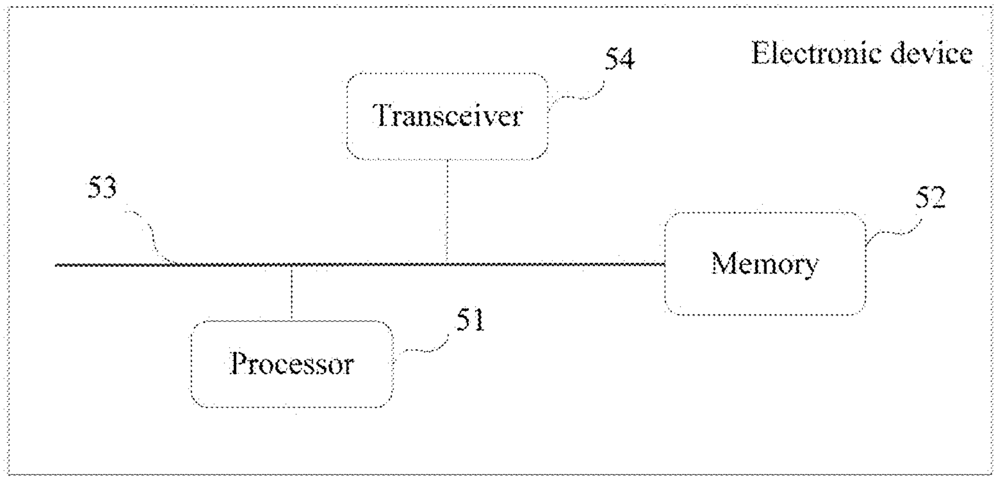
FIG. 5 is a schematic diagram of a structure of an electronic device according to this application.

This application further provides an electronic device. FIG. 5 is a diagram of a structure of an electronic device according to this application. As shown in FIG. 5, the electronic device provided in this embodiment includes at least one processor 51 and a memory 52. Optionally, the device 5 further includes a communication component 53. The processor 51, the memory 52, and the communication component 53 are connected by using a bus 54.

In a specific implementation process, the at least one processor 51 executes computer-executable instructions stored in the memory 52, so that the at least one processor 51 performs the foregoing method.

For a specific implementation process of the processor 51, refer to the foregoing method embodiments. Implementation principles and technical effects of the processor 51 are similar. Details are not described again in this embodiment.

In the foregoing embodiment, it should be understood that the processor may be a central processing unit (English: Central Processing Unit, CPU for short), or may be another general-purpose processor, a digital signal processor (English: Digital Signal Processor, DSP for short), an application-specific integrated circuit (English: Application-Specific Integrated Circuit, ASIC for short), or the like. The general-purpose processor may be a microprocessor, or the processor may be any conventional processor or the like. The steps of the method disclosed with reference to the present disclosure may be directly performed by a hardware processor, or may be performed by a combination of hardware and software modules in the processor.

The memory may include a high-speed memory (Random Access Memory, RAM), and may further include a non-volatile memory (Non-volatile Memory, NVM), for example, at least one magnetic disk memory.

The bus may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, or the like. For ease of illustration, the bus in the figure of this application is not limited to only one bus or one type of bus.

This application further provides a computer program product, including a computer program. The foregoing method is implemented when the computer program is executed by a processor.

This application further provides a computer-readable storage medium. The computer-readable storage medium stores computer-executable instructions. The foregoing method is implemented when a processor executes the computer-executable instructions.

The readable storage medium may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The readable storage medium may be any usable medium accessible to a general-purpose or dedicated computer.

An example readable storage medium is coupled to a processor, so that the processor can read information from the readable storage medium and can write information into the readable storage medium. Certainly, the readable storage medium may alternatively be a part of the processor. The processor and the readable storage medium may be located in an application-specific integrated circuit (Application-Specific Integrated Circuits, ASIC for short). Certainly, the processor and the readable storage medium may alternatively exist in the device as discrete components.

Division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, functional units in embodiments of the present disclosure may be integrated into one processing unit, or each of the units may exist alone physically, or two or more units are integrated into one unit.

When the function is implemented in a form of a software functional unit and sold or used as an independent product, the function may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

A person of ordinary skill in the art may understand that all or some of the steps in the foregoing method embodiments may be implemented by instructing related hardware by a program. The foregoing program may be stored in a computer-readable storage medium. The program, when executed, performs steps of the method embodiments described above. The storage medium includes any medium that can store program code, such as a ROM, a RAM, a magnetic disk, or an optical disc.

Finally, it should be noted that a person skilled in the art can easily figure out another implementation solution of the present disclosure after considering this specification and practicing the present disclosure that is disclosed herein. The present disclosure is intended to cover any variations, purposes, or adaptive changes of the present disclosure. These variations, purposes, or adaptive changes follow the general principles of the present disclosure and include common sense or conventional technical means in the art that are not disclosed in the present disclosure, are not limited to the precise structures described above and shown in the accompanying drawings, and may be modified or changed without departing from the scope thereof. The scope of the present disclosure is limited by only the appended claims.

The invention claimed is:

1. A picture content enhancement method, wherein the method comprises:

recognizing and tracking at least one first target object based on a picture video stream, to obtain attribute information and real-time position information of the first target object;

obtaining a preset status event script synchronized with a picture content timeline, wherein the status event script comprises a real-time display status defined according to a time sequence;

querying a corresponding target display status from the status event script based on a current picture timestamp, and generating the status data based on the target display status; and for any first target object, generating a corresponding information buoy by using the real-time position information as a spatial anchor, and overlaying and rendering the information buoy onto a corresponding frame of the picture video stream, wherein visual content of the information buoy dynamically reflects the status data.

2. The method according to claim 1, wherein the overlaying and rendering the information buoy onto a corresponding frame of the picture video stream comprises:

recognizing and tracking at least one preset key region of a second target object; and adjusting a rendering position of the information buoy according to a preset avoidance rule when detecting that the information buoy overlaps any preset key region.

3. The method according to claim 2, wherein the recognizing and tracking at least one preset key region of a second target object comprises:

dynamically determining a real-time position of the preset key region based on the picture video stream and/or pre-obtained action data associated with the second target object.

4. The method according to claim 3, wherein the dynamically determining a real-time position of the preset key region based on the picture video stream and/or pre-obtained action data associated with the second target object comprises:

performing frame-by-frame processing on the picture video stream by using a posture recognition algorithm based on a pre-trained multi-part detection model, and directly outputting coordinates of each preset key region in an image; or obtaining a preset standard action sequence synchronized with the picture video stream, and mapping and reading corresponding standard position coordinates from the preset standard action sequence as the real-time position based on a time point of a current frame of the picture video stream, wherein the preset standard action sequence is used to indicate standard position coordinates of the at least one preset key region that correspond to a time point of each frame of the picture video stream.

5. The method according to claim 3, wherein the dynamically determining a real-time position of the preset key region based on the picture video stream and/or pre-obtained action data associated with the second target object comprises:

obtaining first real-time position information based on the picture video stream;

obtaining second real-time position information based on the pre-obtained action data associated with the second target object; and performing fusion processing on the first real-time position information and the second real-time position information according to a preset fusion rule, to output a final real-time position.

6. The method according to claim 2, wherein the preset key region is a region that is associated with display of the first target object and to which the second target object belongs.

7. The method according to claim 2, wherein the detecting that the information buoy overlaps any preset key region comprises:

calculating an intersection over union between a rendering region of the information buoy and a predetermined region constructed based on a real-time position of the preset key region; and if the intersection over union is greater than zero, determining that there is an overlap.

8. The method according to claim 2, wherein the adjusting a rendering position of the information buoy according to a preset avoidance rule comprises:

predefining a plurality of candidate positions around the spatial anchor;

selecting a target candidate position that overlaps none of all preset key regions from the candidate positions; and determining a target rendering position of the information buoy from the target candidate position according to a preset order.

9. The method according to claim 2, wherein when at least two first target objects are recognized, the adjusting a rendering position of the information buoy according to a preset avoidance rule comprises:

establishing a global layout constraint, wherein the global layout constraint comprises that an overlap rate between information buoys is less than a first preset value, and an overlap rate between each information buoy and each preset key region is less than a second preset value; and performing synchronous calculation and allocation on a rendering position of each information buoy based on the global layout constraint.

10. The method according to claim 1, wherein the generating a corresponding information buoy by using the real-time position information as a spatial anchor comprises:

generating a main body graphic and a pointing graphic of the information buoy, wherein the main body graphic comprises visual content of the attribute information and the status data of the first target object; and configuring the pointing graphic, so that one end of the pointing graphic is connected to the main body graphic and another end points to the spatial anchor, to obtain the information buoy and establish a visual association between the main body graphic and the first target object.

11. The method according to claim 1, wherein the method further comprises:

establishing a mapping relationship between at least one numerical value of the status data and at least one corresponding visual dynamic parameter; and driving, based on the mapping relationship, the information buoy to perform dynamic rendering, wherein the visual dynamic parameter comprises at least one of dynamic effects of the information buoy, and the dynamic effects comprise an occupied area, a color value, a flicker frequency, a position jitter amplitude, a virtual object, a virtual character, a countdown timer, a preset special effect or a dynamic widget.

12. The method according to claim 1, wherein the obtaining status data associated with the first target object comprises:

establishing a data connection with the first target object;

receiving, through the data connection, a sensor data stream that is output by a sensing unit of the first target object; and parsing the sensor data stream to obtain the status data.

13. The method according to claim 1, wherein the obtaining status data associated with the first target object comprises:

collecting at least one input signal associated with manipulation behavior of a second target object, wherein the input signal comprises an operation instruction signal from a control panel or an image signal from the picture video stream; and generating the status data according to a corresponding parsing rule based on a type of the collected input signal.

14. The method according to claim 13, wherein the parsing rule comprises:

when the operation instruction signal is collected, parsing the operation instruction signal into the status data based on a first mapping relationship;

when the image signal is collected, extracting an action feature from the image signal by using an image recognition technology, and converting the action feature into the status data based on a second mapping relationship; or when both the operation instruction signal and the image signal are collected, generating a reference status parameter based on the operation instruction signal, and correcting the reference status parameter based on an action feature extracted from the image signal, to obtain the status data.

15. The method according to claim 1, wherein the obtaining status data associated with the first target object comprises:

obtaining at least one associated signal, wherein the associated signal comprises an image signal from the picture video stream, a voice signal of a second target object, and a visual change signal of the first target object; and performing fusion analysis on the at least one associated signal based on a preset inference model, to determine the status data.

16. The method according to claim 1, wherein the recognizing and tracking at least one first target object based on a picture video stream comprises:

performing frame-by-frame target detection on the picture video stream, to recognize a candidate first target object region;

extracting an appearance feature based on the candidate first target object region by using a re-identification network; and maintaining an independent tracking trajectory and assigning a unique identity for each continuously tracked first target object based on the appearance feature and motion trajectory information.

17. The method according to claim 1, wherein the overlaying and rendering the information buoy onto a corresponding frame of the picture video stream comprises:

determining an initial rendering position of the information buoy in a picture coordinate system based on the spatial anchor defined by the real-time position information;

verifying the initial rendering position, and adjusting the initial rendering position according to a preset boundary avoidance rule when a partial or entire region of the information buoy exceeds a picture display boundary, so that an adjusted information buoy is completely located within the picture display boundary; and performing composite rendering on the information buoy located at an adjusted rendering position and a current frame image of the picture video stream.

18. A picture content enhancement system, wherein the system comprises:

a target object recognition module, configured to recognize and track at least one first target object based on a picture video stream, to obtain attribute information and real-time position information of the first target object;

a status data capture and synchronization module, configured to: obtaining a preset status event script synchronized with a picture content timeline, wherein the status event script comprises a real-time display status defined according to a time sequence; and querying a corresponding target display status from the status event script based on a current picture timestamp, and generating the status data based on the target display status; and a buoy generation and overlay module, configured to: for any first target object, generate a corresponding information buoy by using the real-time position information as a spatial anchor, and overlay and render the information buoy onto a corresponding frame of the picture video stream, wherein visual content of the information buoy dynamically reflects the status data.

19. An electronic device, comprising at least one processor and a memory, wherein the memory stores computer-executable instructions; and the processor executes the computer-executable instructions stored in the memory, so that the processor performs:

recognizing and tracking at least one first target object based on a picture video stream, to obtain attribute information and real-time position information of the first target object;

obtaining a preset status event script synchronized with a picture content timeline, wherein the status event script comprises a real-time display status defined according to a time sequence;

querying a corresponding target display status from the status event script based on a current picture timestamp, and generating the status data based on the target display status; and for any first target object, generating a corresponding information buoy by using the real-time position information as a spatial anchor, and overlaying and rendering the information buoy onto a corresponding frame of the picture video stream, wherein visual content of the information buoy dynamically reflects the status data.

* * * * *